US007480701B2

(12) United States Patent
Smith et al.

(10) Patent No.: US 7,480,701 B2
(45) Date of Patent: Jan. 20, 2009

(54) MIXED-MEDIA SERVICE COLLECTIONS FOR MULTIMEDIA PLATFORMS

(75) Inventors: Geoffrey Smith, Mountain View, CA (US); Daniel J. Zigmond, Freiburg (DE); Dustin L. Green, Redmond, WA (US); James Armand Baldwin, Redwood City, CA (US); Kevin T. Carle, Mountain View, CA (US); Patrik Schnell, Cupertino, CA (US); Peter T. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 818 days.

(21) Appl. No.: 11/013,303

(22) Filed: Dec. 15, 2004

(65) Prior Publication Data

US 2006/0156352 A1    Jul. 13, 2006

(51) Int. Cl.
  *G06F 15/16* (2006.01)
(52) U.S. Cl. ............... 709/217; 709/218; 709/219; 709/226; 725/109; 725/112
(58) Field of Classification Search ............ 709/217, 709/218, 219, 226; 725/109, 112
  See application file for complete search history.

(56) References Cited

U.S. PATENT DOCUMENTS 6,886,033 B1 * 4/2005 Brush et al. ............... 709/217

2002/0083464 A1 6/2002 Tomsen et al.
2002/0144281 A1 * 10/2002 Taguchi et al. ............ 725/109
2003/0204551 A1 * 10/2003 Chen ......................... 709/102

FOREIGN PATENT DOCUMENTS

| EP | 0705036 | 4/1996 |
|---|---|---|
| EP | 0721253 | 7/1996 |
| EP | 0725538 | 8/1996 |
| EP | 1026887 | 8/2000 |
| EP | 1097583 | 5/2001 |
| EP | 1246465 | 10/2002 |
| EP | 1465426 | 10/2004 |
| WO | WO0177778 | 10/2001 |

OTHER PUBLICATIONS

European Search Report.

* cited by examiner

*Primary Examiner*—Jinsong Hu
(74) *Attorney, Agent, or Firm*—Lee & Hayes, PLLC

(57) ABSTRACT

A mixed-media service collection for multimedia platforms allows simultaneous access to various mixed-media services for rendering multimedia content, depending on current client conditions. In one implementation, in response to the client accessing a service collection, for example, by changing channels, only some of the mixed-media services in the service collection are simultaneously actuated based on client conditions. The client conditions may include the availability of subsystems to implement services and the client's authorization to receive services. If client conditions do not allow some services in the service collection to be actuated, then other services in the service collection are available to be actuated instead.

19 Claims, 15 Drawing Sheets

Channel Map 402

| CH # | Service Collection 702 | EPG Data 704 | UI Hints 706 |
|---|---|---|---|
| 2 | "GCP" – Unique ID | GCP EPG – Unique ID | -- |
| 3 | "Movie Epic" – Unique ID | Movie Epic EPG – Unique ID | Pop_VOD_Group |
| 4 | "Checkers" – Unique ID | Checkers EPG – Unique ID | App_Group |
| 5 | "Art Photos" – Unique ID | Art Photos EPG – Unique ID | Photo_Group |

Fig. 7

Service Collection Map 404

| Service Collection Unique ID | Service Unique ID 800 | Context Unique ID 802 |
|---|---|---|
| GCP Unique ID | Unique ID 1<br>Unique ID 2<br>Unique ID 3<br>Unique ID 4 | Fullscreen Primary - Unique ID<br>PIP Primary - Unique ID<br>Fullscreen Secondary - Unique ID<br>PIP Secondary - Unique ID |
| Movie Epic Unique ID | Unique ID 5<br>Unique ID 6<br>Unique ID 7<br>Unique ID 8 | Fullscreen Primary - Unique ID<br>PIP Primary - Unique ID<br>Fullscreen Secondary - Unique ID<br>PIP Secondary - Unique ID |
| Checkers Unique ID | Unique ID 9<br>Unique ID 10 | Fullscreen Primary - Unique ID<br>PIP Primary - Unique ID |
| Art Photos Unique ID | Unique ID 11<br>Unique ID 12<br>Unique ID 13 | Fullscreen Primary - Unique ID<br>Fullscreen Primary - Unique ID<br>PIP Secondary - Unique ID |

Fig. 8

SERVICE MAP 406

| SERVICE UNIQUE ID | SUBSYSTEM AND PROFILE 900 | SERVICE AND TYPE-SPECIFIC DATA 902 |
|---|---|---|
| UNIQUE ID 1 | LIVE.UNICAST.ACMERTP.UDP | -- (FROM LIVE SUBSYSTEM) |
| UNIQUE ID 2 | LIVE.UNICAST.ACMERTP.UDP | -- (FROM LIVE SUBSYSTEM) |
| UNIQUE ID 3 | LIVE.UNICAST.ACMERTP.UDP | -- (FROM LIVE SUBSYSTEM) |
| UNIQUE ID 4 | LIVE.UNICAST.ACMERTP.UDP | -- (FROM LIVE SUBSYSTEM) |
| UNIQUE ID 5 | ACMEVOD.HTTP | VOD UNIQUE ID5 DESCRIPTOR FILE URL |
| UNIQUE ID 6 | ACMEVOD.HTTP | VOD UNIQUE ID6 DESCRIPTOR FILE URL |
| UNIQUE ID 7 | ACMEVOD.HTTP | VOD UNIQUE ID7 DESCRIPTOR FILE URL |
| UNIQUE ID 8 | ACMEVOD.HTTP | VOD UNIQUE ID8 DESCRIPTOR FILE URL |
| UNIQUE ID 9 | APPLICATION.RDP | SERVER IP, APP PATH, APP ARGUMENTS |
| UNIQUE ID 10 | STILL.JPEG | URL |
| UNIQUE ID 11 | SLIDESHOW | SLIDESHOW DESCRIPTOR FILE URL |
| UNIQUE ID 12 | AUDIO.MP3 | PLAYLIST URL |

Fig. 9

Subsystem Map 408

| Subsystem 900 | Subsystem-Specific Data 1000 |
|---|---|
| Live | Live License Server Location |
| AcmeVOD | VOD License Server Location |
| Application | Application License Server Location |
| Still | — |
| SlideShow | — |
| Audio | Location of Private Media Files |

*Fig. 10*

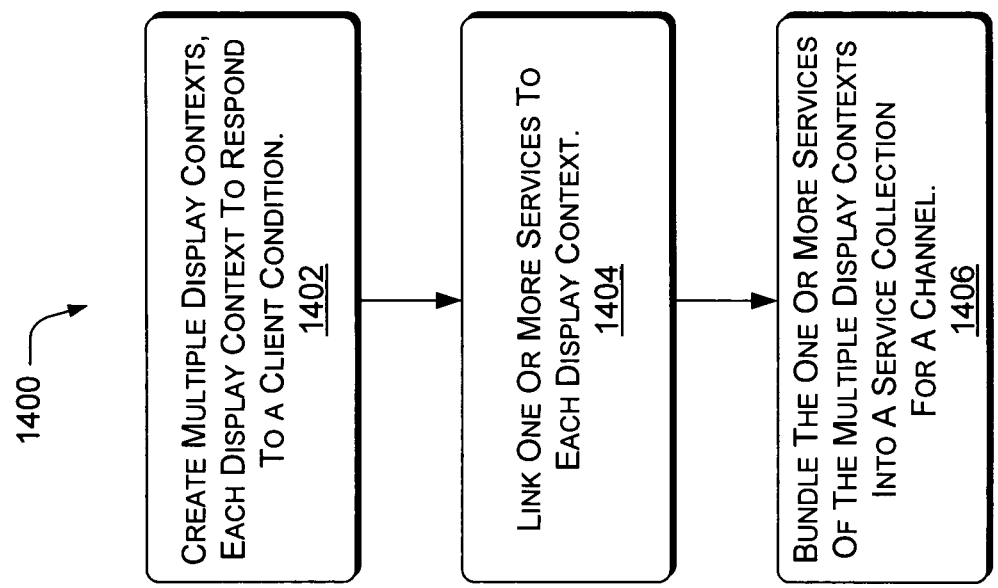

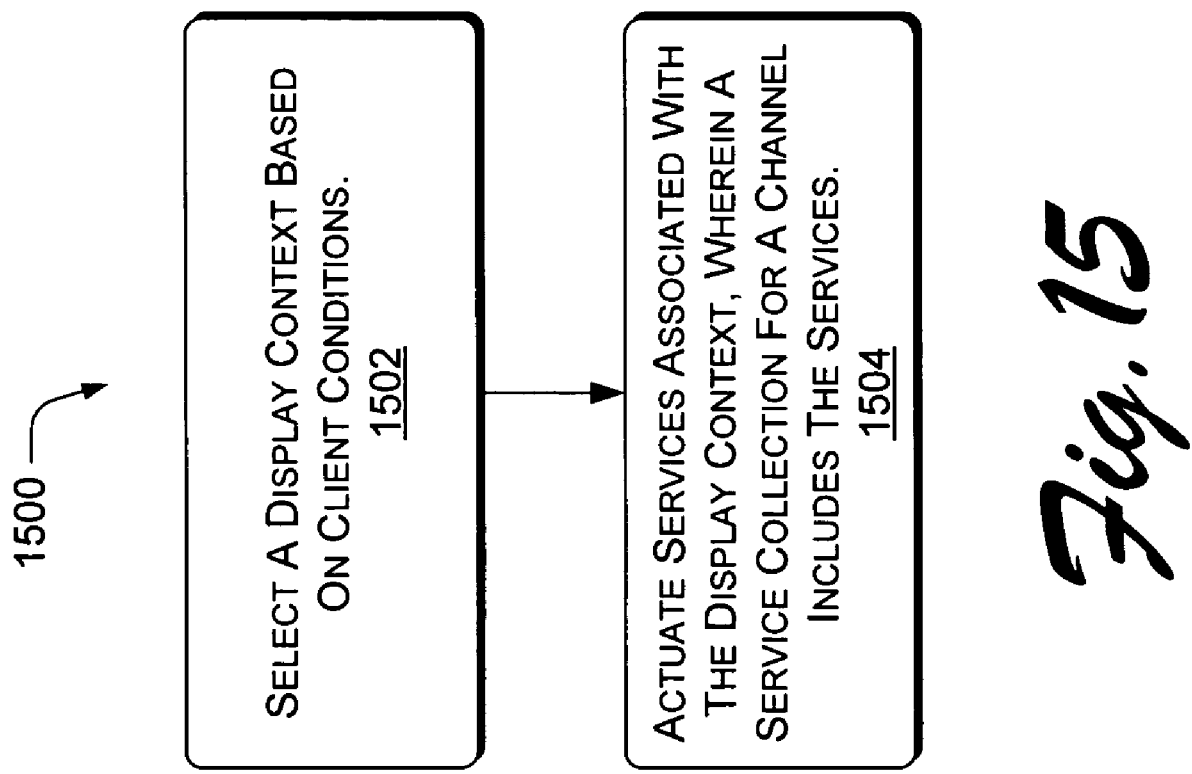

MIXED-MEDIA SERVICE COLLECTIONS FOR MULTIMEDIA PLATFORMS

TECHNICAL FIELD

The subject matter described herein relates generally to multimedia systems and more specifically to mixed-media service collections for multimedia platforms.

BACKGROUND

Digital television services and other multimedia service providers often desire to make some services selectively available to their customers. For example, a collection of channels might be made available only to customers who pay an extra monthly fee, or a video on demand movie may be available only to those who have paid the viewing fee. Conventional solutions for providing selectively available content rely on withholding encryption keys, or otherwise making it impossible for a client to decode an unauthorized part of the content stream. These types of conventional techniques succeed in enabling a degree of differential service, but a problem remains—deciding what to display in place of a denied video stream.

FIG. 1 shows a conventional multimedia system 100, in which a multimedia service provider offers content from a multimedia content store 102, via a headend 104. The headend 104 may transfer the multimedia content "as is," or in some circumstances, the headend 104 may also include a conventional layer encryption engine 106 that sends the media content to clients as one or more encrypted versions or "layers." At a first set top box 108, a conditional access module (CAM) 110 has access to a license or a decryption key for unlocking the multimedia content. Thus, at a monitor or television screen 112, the multimedia content is displayed. At a second set top box 114, however, the client's CAM 116 does not have access to proper credentials (license and/or decryption key) for unlocking the multimedia content. The conventional multimedia system 100 has no mechanism for providing a very flexible multimedia alternative for the denied content, so the monitor 118 is either left blank, the content is scrambled, or an "unavailable" message is displayed. Sometimes a mechanism for purchasing the denied content is provided with the "unavailable" message. What is needed in circumstances similar to this is a collection of presentation alternatives related to the denied content so that some of the alternatives can be presented on a channel in response to client conditions, such as the hardware and authorization reasons for the denial.

SUMMARY

A mixed-media service collection for multimedia platforms allows simultaneous access to various mixed-media services for rendering multimedia content, depending on current client conditions. In one implementation, in response to the client accessing a service collection, for example by changing channels, only some of the mixed-media services in the service collection are simultaneously actuated based on client conditions. The client conditions may include the availability of subsystems to implement services and the client's authorization to receive services. If client conditions do not allow some services in the service collection to be actuated, then other services in the service collection may be available to be actuated instead.

The subject matter described herein also provides a flexible and versatile structure for service information ("SI"). The exemplary SI structure allows a multimedia client to receive a dynamic bundle of services—the "service collection"—for each channel and to react to current client conditions by actuating alternative content and display techniques from the bundle if conditions do not allow display of "first choice" content and/or first-choice display techniques.

As multimedia devices become more generic and less tied to a particular codec or delivery method, service providers and clients may wish to combine entirely different service types into a coherent display. For example, one type of application can display a slide show of pictures that have been downloaded over the Internet, while at the same time playing content from an Internet radio station. In addition to displaying multiple service types simultaneously, the client may wish to use different service types for the authorized and unauthorized versions of the same piece of content. For example, a video on demand movie may simply use the promotional poster encoded as a static image, as the preview service. There are a myriad of other interesting ways to render multimedia content using a service collection that conventional techniques cannot do.

BRIEF DESCRIPTION OF THE DRAWINGS

FIG. 7 is a diagrammatic representation of an exemplary channel map.

FIG. 8 is a diagrammatic representation of an exemplary service collection map.

FIG. 9 is a diagrammatic representation of an exemplary service map.

FIG. 10 is a diagrammatic representation of an exemplary subsystem map.

FIG. 14 is a flow diagram of an exemplary method of creating a service collection for a channel.

FIG. 15 is a flow diagram of an exemplary method of using a service collection.

DETAILED DESCRIPTION

Overview

The subject matter described herein provides a flexible and versatile structure for service information ("SI") that can be used by multimedia clients for rendering multimedia content, e.g., on television and audio channels. In one implementation, the flexible and versatile SI structure allows a dynamic bundle of mixed-media services—a "service collection"—to be associated with a conventional channel number. A multimedia client can then react to current client conditions by actuating alternative content and display techniques from the bundle if conditions do not allow display of "first choice" content or display mode. Allowing one or more channel numbers in a channel lineup to access a mixed-media service collection replaces a conventional technique of sending multimedia content of a single service type for each multimedia channel.

One benefit of a service collection of mixed-media services being available for each channel is that in each display context available in the service collection, multiple services can be received and rendered simultaneously. Thus, for example, while channel 4 is playing a movie in full resolution, a user may wish to navigate around other available services, viewing them in a preview mode. In conventional television, these simultaneous services are achieved by having an extra tuner within the television or set top box, tuning to the other stream using the extra tuner, and scaling the image down to a "picture-in-picture" (PIP) window—in other words, by doubling the tuning equipment. Various digital cable and satellite systems have implemented this conventional feature, using the same strategy of keeping an extra tuner on board, decoding the stream at full size, and scaling the stream down. This solution is unsatisfactory, however, for inexpensive client devices that may not have two tuners, or that may not have enough spare power to perform a continuous rescale operation; also it is unsatisfactory for non-broadcast systems (for example, a unicast television delivery platform would have to spend server power, bandwidth, and client power to send a whole extra main stream). In the exemplary subject matter described herein, by allowing the client to tune to a service collection instead of to a service, multiple forms of content can be displayed simultaneously, not by separately receiving and tuning multiple additional main streams, but by actuating multiple services in the service collection for the tuned channel.

Service Collections

Figure 1:
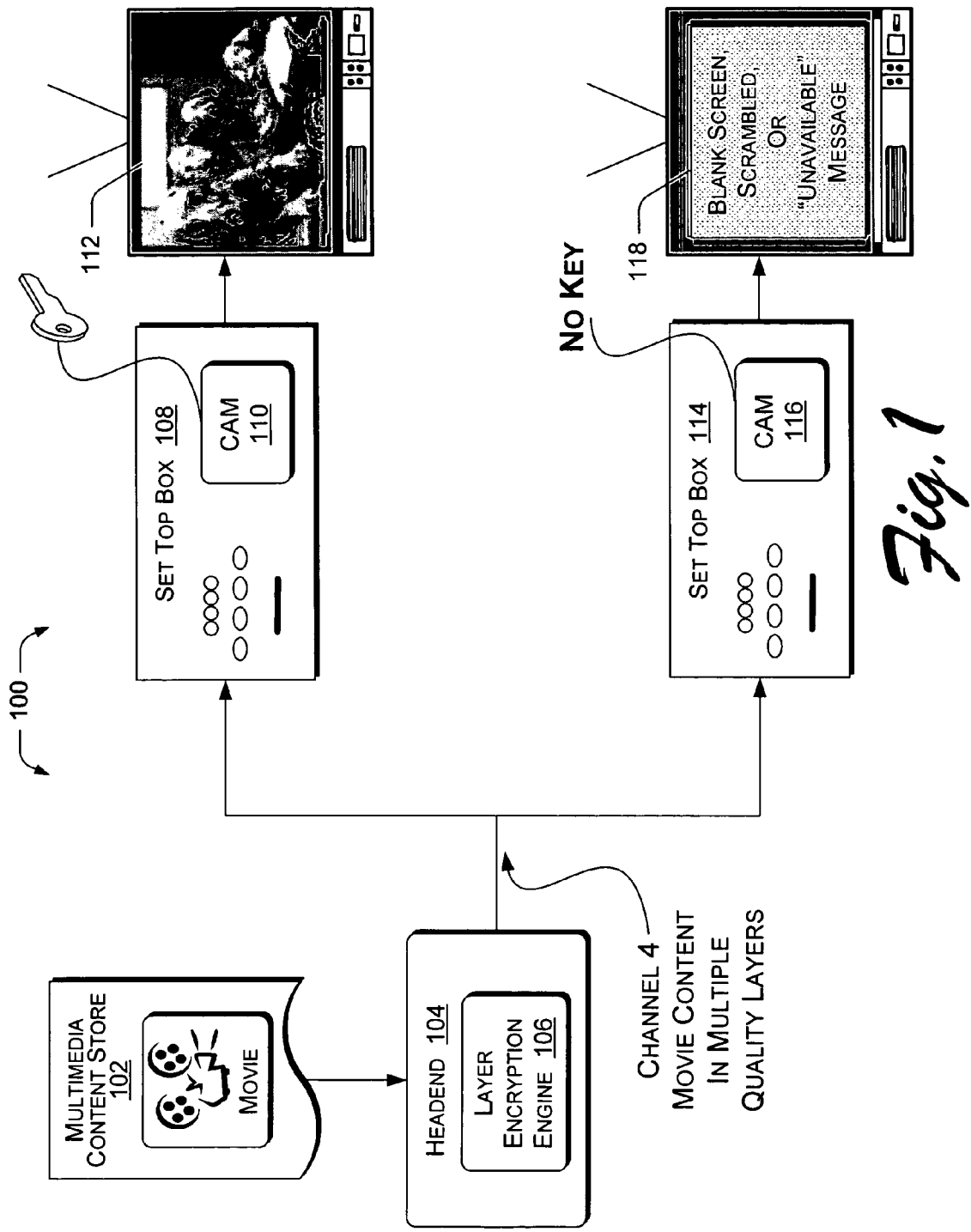
FIG. 1 is a diagrammatic representation of a conventional multimedia system in which clients who lack authorization are refused services.
Figure 2:
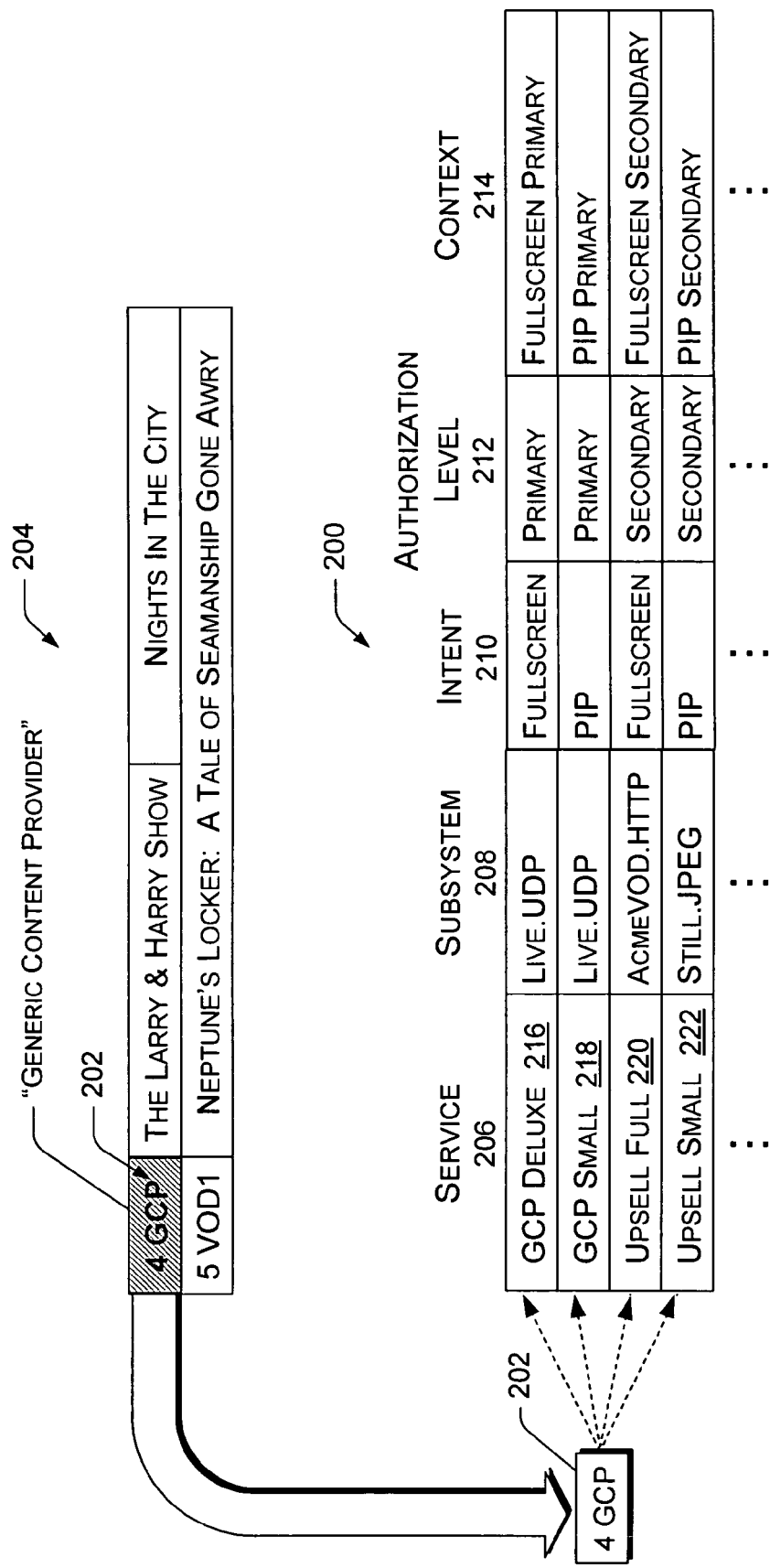
FIG. 2 is a diagrammatic representation of an exemplary service collection.

FIG. 2 shows part of an exemplary service collection map 200, shown in a "grid" format of a relational database. A title 202 for a channel's particular service collection map 200, e.g., "GCP-Channel 4" for a hypothetical "generic content provider" (GCP) on channel 4, can be exposed via the service collection's unique identifier (hereinafter, "unique ID" or just "identifier") in a program guide grid 204. It should be noted that unique identifiers can be strings (e.g., human readable text), integers, "globally unique identifiers" (GUIDs), etc. These identifiers can be generated using a variety of techniques, including manual allocation, auto-generation, manual allocation appended with an auto-generated portion to guarantee global uniqueness, etc.

A service collection map 200 bundles individual services 206 together for each channel, and relates each channel's bundle to an identifier representing the channel's service collection. That is, a service collection identifier represents the channel as a service collection. Or again, a service collection is a collection of relationships between services and a channel, described by a service collection map 200.

The illustrated example service collection map 200 includes categories (in a human readable language), namely, "service" 206, "subsystem" 208, "intent" 210, "authorization level" 212, and display "context" 214. The categories just enumerated are included for purposes of explanation and description. A service collection map 200 for use in an actual implementation of the subject matter may include fewer categories, and entries in the fewer categories are typically just the unique identifiers for the various entities in the map. (The service collection map to be described with respect to FIG. 8, below, is another example map with fewer categories.) An actual service collection map 200 might include only a first category of unique IDs representing each channel's service collection, a second category of unique IDs of each service 206 in a service collection, and perhaps a category of unique IDs of each service's display context 214. In some implementations, mapping from services to the hardware and software subsystems that implement the services is achieved through a separate services map, to be described further below. In one implementation, service collection map 200 and related maps to be discussed below are structured in extensible markup language (XML) or one of its derivative languages.

The illustrated service collection map 200 links each service 206 to a display context 214 for rendering the service 206. The display context 214 can be derived from two other categories, the intent 210 and the authorization level 212, and so these other categories are included to aid the description. "Intent," as used herein, loosely refers to a given set of presentation parameters (e.g., video and audio) that could be implemented on a given set of available subsystems.

A service collection 200, i.e., as depicted through a service collections map 200, may include various services 206 for providing multiple quality versions (e.g., 216, 218) of a program to be rendered in various resolutions or bit rates and may also include other types of services 206 such as previews, video trailers, posters (e.g., still JPEG images), slideshows, picture-in-picture (PIP) streams, still and moving thumbnails, advertisements and "upsells" (e.g., 220, 222), for encouraging purchase of the better quality versions of the content. A service collection 200, therefore, can be thought of an extensive toolbox of ways to present various multimedia contents associated with a channel and/or various quality levels of the multimedia content, depending on client conditions.

An exemplary SI structure allows a client device to consistently decide which stream to use in given client conditions. For example, a multimedia service provider may generate two multimedia streams that correspond to channel 4 GCP 202—one stream at 1.5 megabits that is a full TV screen worth of data (e.g., 216), and another stream at 150 kilobits that is a 120-pixel-by-100-pixel PIP window (e.g., 218). An exemplary engine, to be discussed below, can determine client conditions to find the proper display context for each of these streams, or whether to use the streams at all.

Services 206, such as those just mentioned, can be conceived of as "atomic building blocks" capable of being assembled into a particular service collection 200. Each service 206 is administered by a corresponding hardware and/or software subsystem 208. For example, if the service includes Internet content, then the corresponding subsystem 208 may include a remote Internet website. Electronic Program Guide (EPG) data is kept separate from a service collection 200 in order to keep the "atomic" services 206 in the service collection 200 unattached from specific EPG data and thus employable in many different service collections 200. Keeping the EPG data separate allows each service 206 to be kept generic and available for potential combination with many possible EPG data depending on the circumstances in which the service collection 200 is actually put to use in a client. Thus, a service 206 is assigned a unique identifier to allow each service 206 to be interchanged or reused in a modular manner in other service collections 200 or in other arrangements of the same service collection 200.

Since each of the services 206 and indeed each service collection 200 becomes an autonomous, reusable, and/or modifiable module addressable via a unique ID, provision of multimedia programming provided by a multimedia service provider can be made flexible and scalable as to the make-up and size of service collections 200 for each channel, with more than one service "tagged" for simultaneous use in a given display context. Using a channel map that is separate from a service collection map 200, EPG data corresponding to the content mediated by the service collection 200 can be associated with the services 206 during execution. Because a service collection 200 consists of a list of services 206, each of which is tagged with a display context 214, there is no restriction on the number of services 206 which may be bundled together to create a particular multimedia display. For example, both a slide show and the address of an Internet radio station may be tagged as "fullscreen primary," meaning that the client should attempt to make use of both streams when displaying the service collection 200 in primary fullscreen mode.

Display Contexts

Referring again to FIG. 2, the exemplary service collection 200 has a number of display contexts 214, such as the four illustrated contexts 214. The four (example) contexts 214 are "fullscreen primary," "PIP primary," "full-screen secondary," and "PIP secondary." A context 214 specifies under what conditions a service 206 is to be rendered, and the selection of a given context 214 implies a determination of the client condition that has been previously set up to trigger selection of the particular context 214. In one implementation, contexts 214 are determined from at least two client conditions, intent 210 and "authorization level" 212. Authorization levels 212 can be primary, secondary, tertiary, etc. If a service 206 has an authorization level 212 labeled as "primary," this means that a stream provided by the service 206 carries data associated with the fully authorized, commercial version of the service (for example, a proprietary GCP feed, or the genuine fullscreen version of a movie. Content provided by services 206 labeled as primary normally includes a version of the content that customers must pay for in order to obtain access. If a service 206 is assigned a "secondary" authentication level 212, this can mean, for example, that a stream provided by the secondary service 206 carries data which is either used as a generic notification (for example, "you have not paid for this service") or that the stream may carry more specific upsell content (for example, the cinematic trailer of a movie).

Additionally, primary and secondary display contexts 214 can be accompanied by tertiary and quaternary options. These would be used when, for example, a particular device does not have the capacity to render some version of a service (for example, a stream available in both high-definition and standard definition modes might make the high-definition stream primary, and the standard definition stream secondary, finally falling back on the tertiary (presumably upsell) stream if the client is not authorized or unable to decode either of the higher priority streams.

As mentioned above, in one implementation intent 210 is an additional condition (besides authorization level 212) that determines which display context 214 should be used to render the multimedia content of a particular service 206 or, put another way, intent 210 is an ingredient of the display context 214. Intent 210 can refer to the display size to be used to display video or, analogously, to the degree of fidelity or number of audio channels (e.g., surround versus stereo) to be imparted to audio on playback. Thus, intent 210 typically depends on an intended display size and the presence of a subsystem available to execute the intended display size. The intended display size is typically determined by a default setting for the user action that is occurring (e.g., changing channels) and/or is determined by rules.

If a service 206 is labeled with a "fullscreen" intent, this means that a fullscreen rendition is intended to be displayed when the user clicks on a program guide entry, performs a channel change operation, or otherwise causes a service 206 to be displayed in the main default viewing scenario. If a service 206 is labeled "PIP," this means that a picture-in-picture partial screen rendition is intended to be displayed, for example, in a preview context. Common intents 210 include bringing up a PIP window to monitor a second service 206 while watching a first service 206 in fullscreen mode; offering a "mosaic program guide" that features PIP preview streams for several channels simultaneously (see FIG. 12); and offering a preview window when navigating around an EPG grid (see FIG. 13). In addition to fullscreen and PIP, a variety of other display contexts 214 such as "quarter screen," "eighth-screen," "thumbnail," etc., are possible.

The decision to not select a default "primary fullscreen" display context 214 of a service collection 200 may be based on the capacities of the client device, as described above and it may be based on the presence or absence of a license or other certificate—i.e., an authentication level 212—enabling the client 308 to actually make use of the encrypted stream. Generally, this decision is left up to the individual client subsystem 208 handling a service 206. In a scenario where encryption keys are pre-provisioned to the client 308 for some channels, this decision can be made immediately upon the tune request. Otherwise, the client 308 may have to attempt to select a service 206, discover that is unable to make use of the service 206, and then proceed to a display context 214 for the secondary authentication level 212 (which may not require any keys).

To recapitulate, in a service collection 200, each service is associated with a subsystem 208 that renders the relevant multimedia content in an associated display context 214, i.e., for video and/or audio. With respect to both video and audio, the determination of which display context 214 gets actualized depends on an intent 210—e.g., for video, an intended display size desirable for the given circumstance and an availability of an associated subsystem to execute the display size; and for audio, the number of audio channels and/or the fidelity to be used for presentation and availability of associated subsystems to execute the audio channels and fidelity. The display context actuated also depends on an authorization level 212 in order to display the quality or type of content for which the client has permission.

Figure 3:
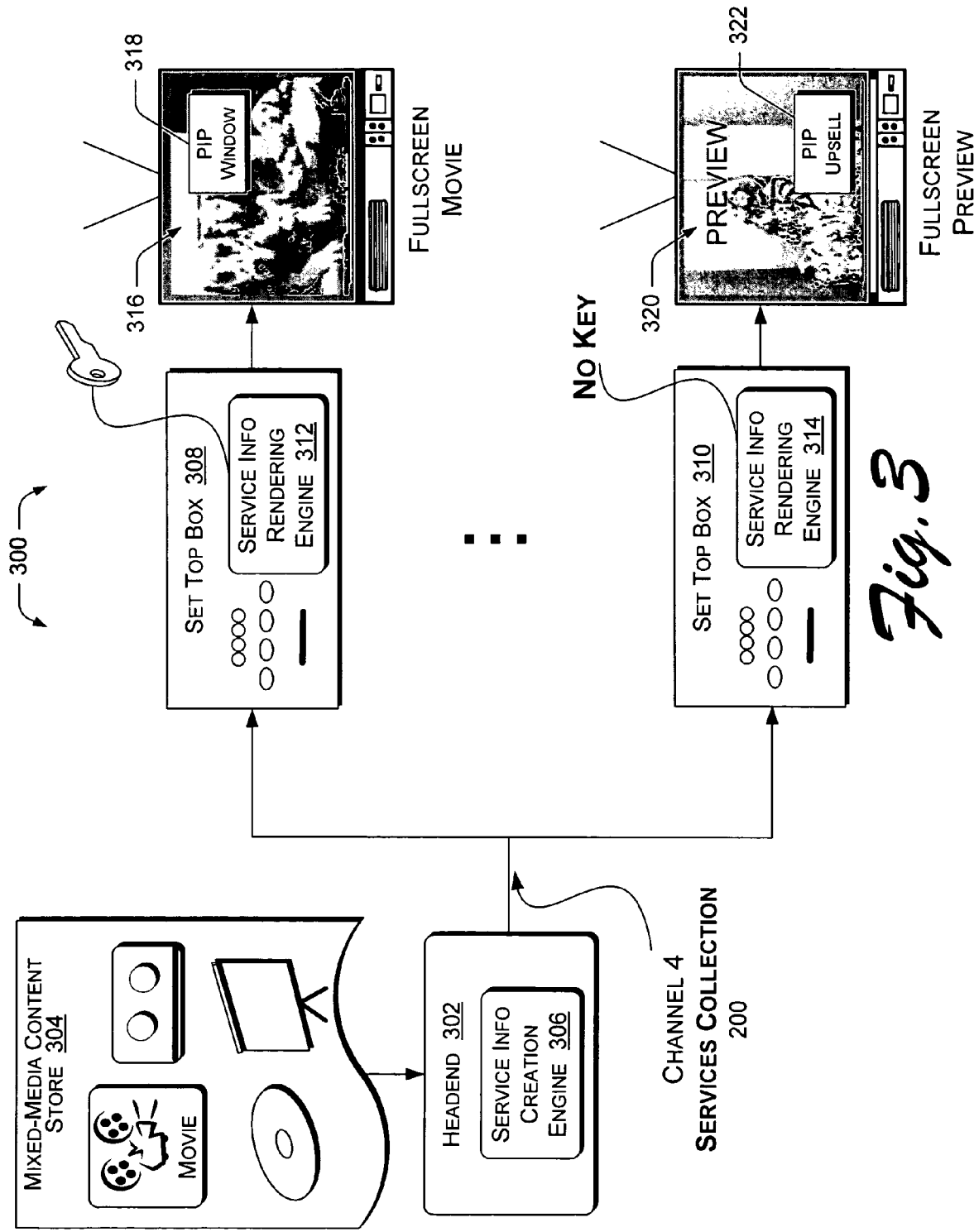
FIG. 3 is a diagrammatic representation of an exemplary multimedia system in which various services are available to clients depending on their levels of authorization.

Accordingly, as shown in FIG. 3, service collections 200 can provide an exemplary multimedia system 300 with the capability of rendering diverse mixed-media services 206. An exemplary multimedia system 300 may include a headend 302 for delivering content from a mixed-media content store 304 (e.g., including Internet links) that further includes a service information (SI) creation engine 306.

Clients in the system, e.g., 308 and 310 may each include a service information (SI) rendering engine, e.g., 312 and 314. The diverse mixed-media services 206 of such an exemplary multimedia system 300 can be tailored for display in dynamic response to changing client conditions and can be combined to render simultaneously, i.e., multiple services 206 can be tagged with the same display context 214. For example, a fullscreen high-resolution movie 316 may display at the same time as a lower resolution PIP window 318 for delivering sign-language dialogue for the movie and both services 206 may display without tuning two main streams with two tuners. A SI navigator 312 tuning in or otherwise processing a service collection 200 can thus allow a client to flexibly shift content and quality of display depending on the client's available hardware, rules, and permissions. This is of great benefit to multimedia service providers, who can provide a uniform set of services and streams, knowing that the actual rendition of content on a client 308 will be customized to meet the current conditions of each individual client 308, e.g., the current state of hardware and authorizations in a client 308. In other words, tuning the same service collection 200 can result in vastly different renderings of content for different clients depending on individual client conditions. Further, each client can receive something useful, instead of a blank screen or a "service unavailable" message with perhaps an offer to buy content that has been denied. That is, a service collection has the advantage that, when a user is not authorized for the main service, the user can be watching something interesting. Thus, a service collection makes it more useful for a service operator to show interesting content when a user is unauthorized, because the interesting content makes the user more likely to buy premium content. The service collection is also useful for the user, because the interesting content makes it easier for a user to find what they want to watch.

The exemplary service collection technology and exemplary SI structures presented herein provide many other benefits to clients. A service collection 200 of mixed-media services 206 enables more open-ended behavior on a multimedia client 310 when one of the services 206 in the service collection bundle is not authorized, not available, or the client 310 is unable to make use of the service 206 (perhaps because of lack of memory or lack of computational power). For example, a movie may be provided with an authorized version that allows the customer to view the full cinematic movie 316, and a free or unauthorized version that allows the client 310 with no key to view both the cinematic trailer or preview 320, and a PIP partial screen upsell 322 to purchase a high quality version of the content shown in the preview 320. So, a client 310 tuning to a service collection 200 is much more likely to receive something useful no matter what client conditions prevail, than a client would that was receiving content via a conventional multimedia system.

Service Information Map Structure

Figure 4:
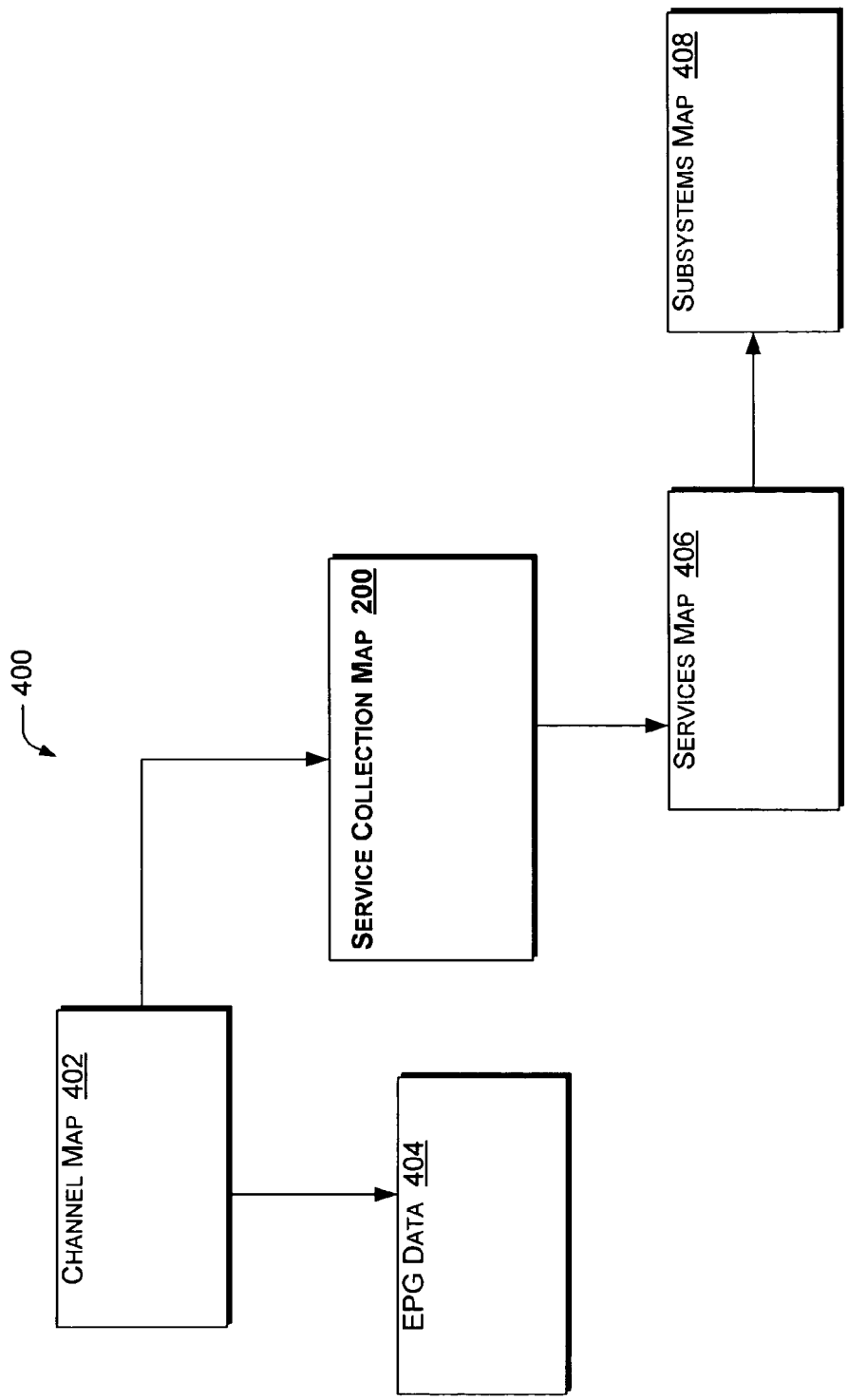
FIG. 4 is a block diagram of an exemplary service information map structure.

FIG. 4 shows an exemplary service information (SI) map structure 400 that supports an exemplary service collection 200. In some implementations, a service collection map 200, such as that shown in FIG. 2, forms a central feature of the SI map structure 400. It should be noted that a service collection map 200 is "central" because there may be many ways of getting accessing a service collection other than through the channel map 402. For example, buttons in a UI may refer directly to a service collection rather than going through the channel map 402. Once a multimedia service provider has assembled suitable service collections for the channels it plans to offer, then a service collection map 200 is assembled relating the various services 206 of each channel to their corresponding display contexts 214, typically using unique IDs. A channel map 402 can then be assembled relating each channel to associated EPG data 404.

In one implementation, once services 206 are actuated, e.g., by a SI navigator 312, a services map 406 links services 206 to be actuated to their respective subsystems 208. Then, a subsystems map 408 may link individual subsystems 208 to specific data, e.g., parameter settings that each subsystem uses to operate. A SI navigator 312 uses service information from an exemplary SI map structure 400 to provide the benefits of service collections 200 to a client 308.

Figure 5:
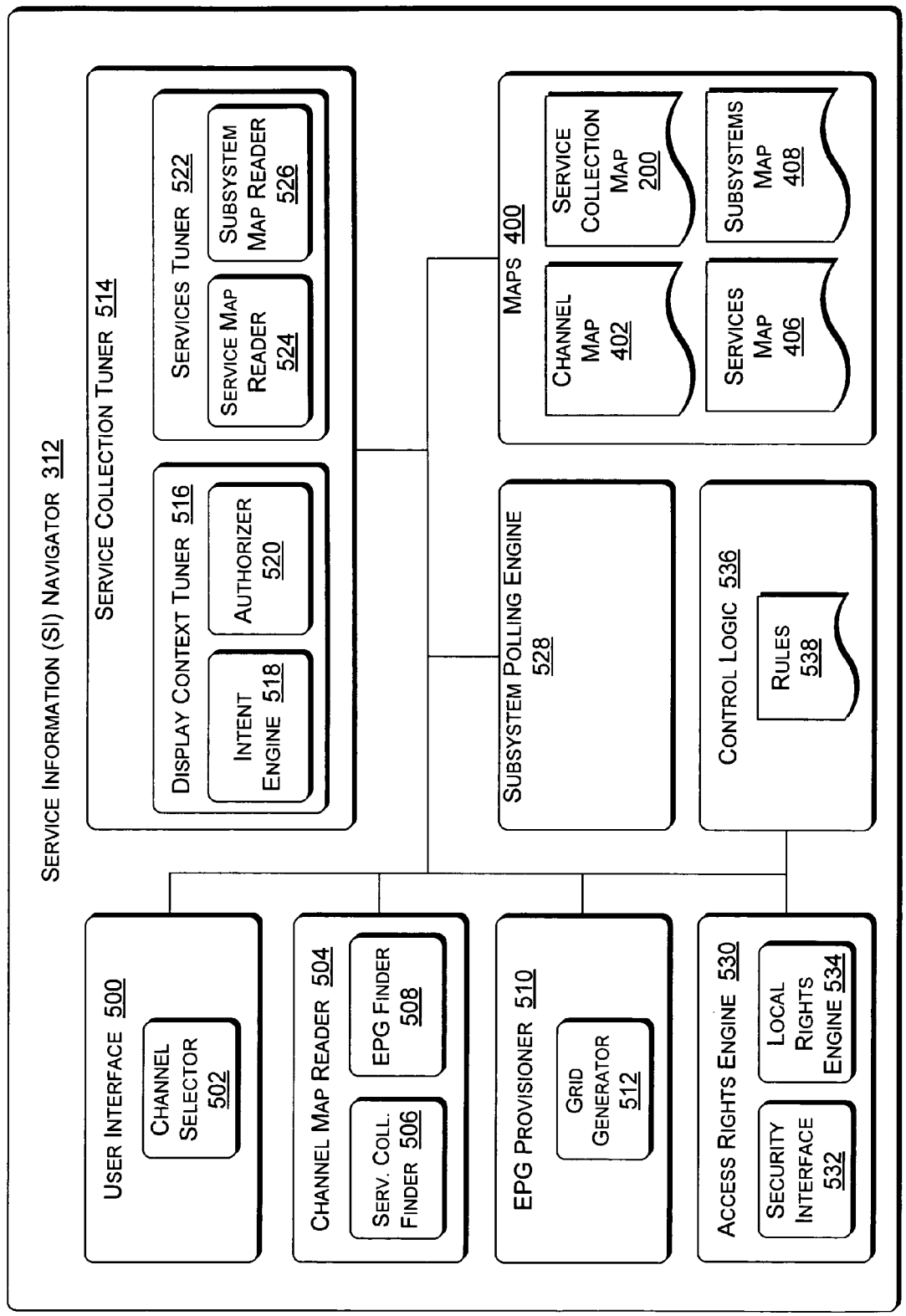
FIG. 5 is a block diagram of an exemplary service information rendering engine.

FIG. 5 shows an exemplary service information (SI) navigator 312 of FIG. 3 in greater detail. An exemplary SI navigator 312 may be implemented in software, hardware (i.e., as an apparatus), or combinations of hardware, software, firmware, etc. The specific configuration of the exemplary SI navigator 312 illustrated in FIG. 5 is only provided as one example, those skilled in the art could devise other possible configurations, using variations in the components. The SI navigator 312 includes or has access to an exemplary SI map structure 400, such as that shown in FIG. 4. For example, the maps may be stored in XML form in the client 308.

An exemplary SI navigator 312 includes a user interface (UI) 500 that further includes a channel selector 502. The UI 500 may consists of a "television screen" manner of visual interface and remote controller with navigation, channel-change, and volume control buttons, etc. Or, the UI 500 may take many other forms, such as a computer monitor UI with mouse and keyboard inputs. In some implementations, a client 308 is pre-provisioned so that if UI 500 displays an upsell service, the client's navigation buttons can automatically select a purchase. Further, the UI 500 can show an upsell service that is of a completely different service type than either the preview or the content to be purchased.

Once a user has selected a channel via the channel selector 502, then a service collection finder 506 reads the channel map 402 to determine a unique ID for the service collection map 200 associated with the channel. Of course, the service collection map 200 for a channel may be a segment of an overall service collection map 200 for all channels to be offered. An EPG finder 508 within the channel map reader 504 discerns a unique ID for EPG information to associate with the service collection map 200. An EPG provisioner 510 that may include a grid generator 512 can build a program guide from the SI information and the found EPG data.

In one implementation, with a service collection 200 ascertained that is relevant to the channel being tuned, an exemplary service collection tuner 514 determines which display contexts 214 and thereby services 206 to actuate. To begin, a display context tuner 516 may deploy an intent engine 518 to determine an intent 210, such as fullscreen, PIP, etc., and an authorizer 520 determines an authorization level 212, usually beginning with "primary" as the initial default. These determinations may establish a display context 214. The service collection tuner 514 can relate the established display context 214 to one or more services 206 tagged with the established display context 214.

A services tuner 522 can include a service map reader 524 and a subsystem map reader 526. The service map reader 524 relates the services 206 associated with the display context 214 to their respective subsystems 208. The subsystem map reader 526 relates the subsystems, in turn, to specific settings and data, if any, that the subsystems use to operate.

In order to determine an intent 210, the intent engine 518 may call a subsystem polling engine 528 to determine which subsystems are currently available in the client 308. If a subsystem 208 for implementing an intent 210 is unavailable, then the service collection tuner 514 may switch to a different display context 214. Likewise, the authorizer 520 may call an access rights engine 530 to determine the client's permission to receive or decrypt a given stream. A security interface 532 sends a request to the headend 302 or a remote server, such as a license server of the multimedia service provider, to learn what digital rights the client 308 possesses. Alternatively, a local rights engine 534 may check digital rights stored locally on the client 308, such as encryption keys pre-provisioned in the client 308.

The components described above with respect to an exemplary SI navigator 312 are each communicatively coupled with control logic 536 and rules 538 as illustrated. The rules 538, e.g., as determined by a multimedia service provider or by a client 308 manufacturer, can be used to control which display contexts 214 and thus which services 206 are actuated in response to given client conditions. Alternatively, or in addition, rules that govern which client conditions trigger particular display contexts can be preprogrammed into a service collection 200.

In one alternative implementation, to be discussed in greater detail with respect to an exemplary method of FIG. 14, the display context tuner 516, the services tuner 522, and their subcomponents include a stair-step approach for determining the display context 214 and services 206 to actuate for a channel. That is, in one implementation, the service collection tuner 514 gathers the services 206 that match the display contexts 214 labeled as primary. Using the service map 406, the services tuner 522 determines the service types of those services 206 and polls the related subsystems 208 to see if they are authorized to provide primary services. If a subsystem 208 indicates that its primary service is not authorized, then the service collection tuner 514 gathers the services 206 that match the display contexts 214 labeled as secondary. In one implementation, the gathering of services is accomplished by sending a request to a security server with the service collection identifier and the identifier of the service 206 that is not authorized. The security server may return keys for services 206 that are authorized, and the process may be repeated until subsystems 208 that can perform the services 206 are available and authorized.

Figure 6:
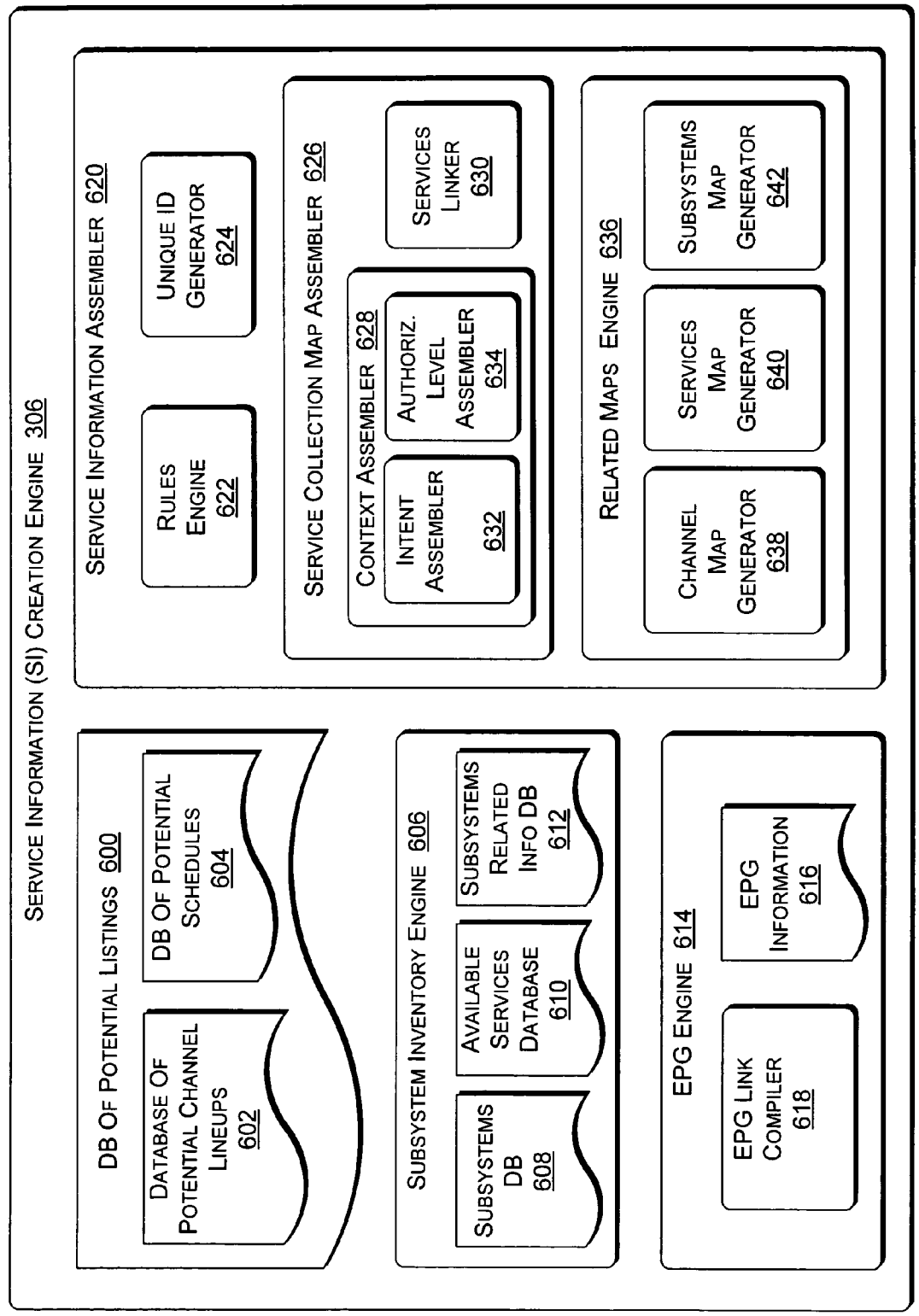
FIG. 6 is a block diagram of an exemplary service information creation engine.

FIG. 6 shows an exemplary service information (SI) creation engine 306, such as that shown in FIG. 3, in greater detail. The SI creation engine 306 is presented to show organizational components used in creating exemplary service information. An exemplary SI creation engine 306 may have components implemented in software, hardware (i.e., as an apparatus), or combinations of hardware, software, firmware, etc. In some implementations, some of the components may preferably be performed manually. The specific configuration of the exemplary SI creation engine 306 illustrated in FIG. 6 is only provided as one example, those skilled in the art could devise other possible configurations, using variations in the components.

A database of potential listings 600 includes a database of potential channel lineup components 602 and a database of potential schedule components 604. In one implementation, a SI creation engine 306 uses a preexisting set of conventional program listings as a foundation for adding services and formatting the information and relationships into exemplary service information. In another implementation, the database of potential listings 600 represents channel and schedule information that can be used as raw material for creating the exemplary service information.

A subsystem inventory engine 606 may be included to produce a database of subsystems 608 potentially employable across a spectrum of possible clients; a database of potential services 610 and a database of specific settings for the subsystems 612. In other words, when designing exemplary service information, a library may develop of possible services and subsystems from which to knit together the exemplary service information structure and maps 400. An EPG engine 614 likewise collects EPG information 616 and an EPG link compiler 618 catalogues or indexes the EPG information by unique ID link.

An exemplary service information assembler 620 creates service information structure, e.g., in XML language, including the structure of the SI maps 400 and their contents. Accordingly, a rules engine 622 may be included to define relationships to be built into the structure, for example, which display contexts 214 will be used for which client conditions. A unique ID generator 624 functions as a labeler, generating a unique identifier whenever one is needed for the SI structure.

In one implementation, a service collection map assembler 626 includes a context assembler 628 and a services linker 630. The context assembler 628 further includes an intent assembler 632 and an authorization level assembler 634. The context assembler 628 generates display contexts 214 for a service collection map 200 by generating or collecting combinations of intents and authorizations that constitute display contexts 214. For example, the authorization level assembler 634 can generate a list of authorization levels 212 and the intent assembler 632 can generate a list of intents 210. The context assembler 628 then decides which combinations of authorization levels and intents to include as display contexts 214 in a service collection 200. In one implementation, the services linker 630 maps services 206 to the display contexts 214 thus assembled.

A "related maps" engine 636 completes an SI map structure 400, and therefore includes a channel map generator 638, a services map generator 640, and a subsystems map generator 642. In one implementation, the channel map generator 638 links a channel number from a channel lineup to a service collection identifier and an EPG data identifier to be provided to customers. The services map generator 640 associates subsystems 208 with the services 206 associated in turn with the display contexts 214. The subsystems map generator 642 associates specific settings and data to their respective subsystems 208.

The SI creation engine 306 can produced a hierarchy of related maps 400 that constitute an exemplary SI structure, including one or more services collections 200.

Service Information Maps

The map components of an exemplary SI map structure 400, as shown in FIG. 4, are now presented in greater detail. Generally, each map consists of a structured language map of relations between unique IDs.

FIG. 7 depicts an exemplary channel map 402. A channel map 402 maps from a channel number, e.g., as determined by a channel selector 502, to a service collection 702 and to an EPG identifier 704 for listings management. In one implementation, the channel map 402 may also map to user interface hints 706, such as "music channel," "hidden," etc., and groupings for column-based display.

As previously mentioned, the channel map 402 allows EPG data to be kept separate from service information, so that components of service information may be mixed, matched, and reused, simply by referring to their unique IDs.

FIG. 8 depicts an exemplary service collection map 404 similar to that shown in FIG. 2, however in FIG. 8 the service collection map 404 comprises mainly unique identifiers, such as GUIDs, or other more human-readable unique identifiers. Unique IDs in the exemplary service collection map 404 associate service collection identifiers 702 to respective service identifiers 800 in each collection. Each service identifier 800 is typically associated with a respective display context identifier 802. In one implementation, a context identifier, e.g., for a display context, may appear in different service collections. For example, a "fullscreen primary" identifier specifies that the context is fullscreen and primary, rather than that the identifier is a link to some other data structure. It should also be noted that there is not necessarily a one-to-one relationship between channels and service collections. A service collection may exist without an associated channel, or many channels may point to the same service collection.

FIG. 9 depicts an exemplary service map 406. Each service identifier 800 is linked to a subsystem identifier 900 and perhaps to a subsystem profile. In one implementation, each service identifier 800 may also be linked to service type-specific data 902.

FIG. 10 depicts an exemplary subsystem map 408. In a subsystem map, each subsystem 900 is associated with corresponding specific settings and subsystem information 1000, if any, for operating the specific subsystem.

Figure 11:
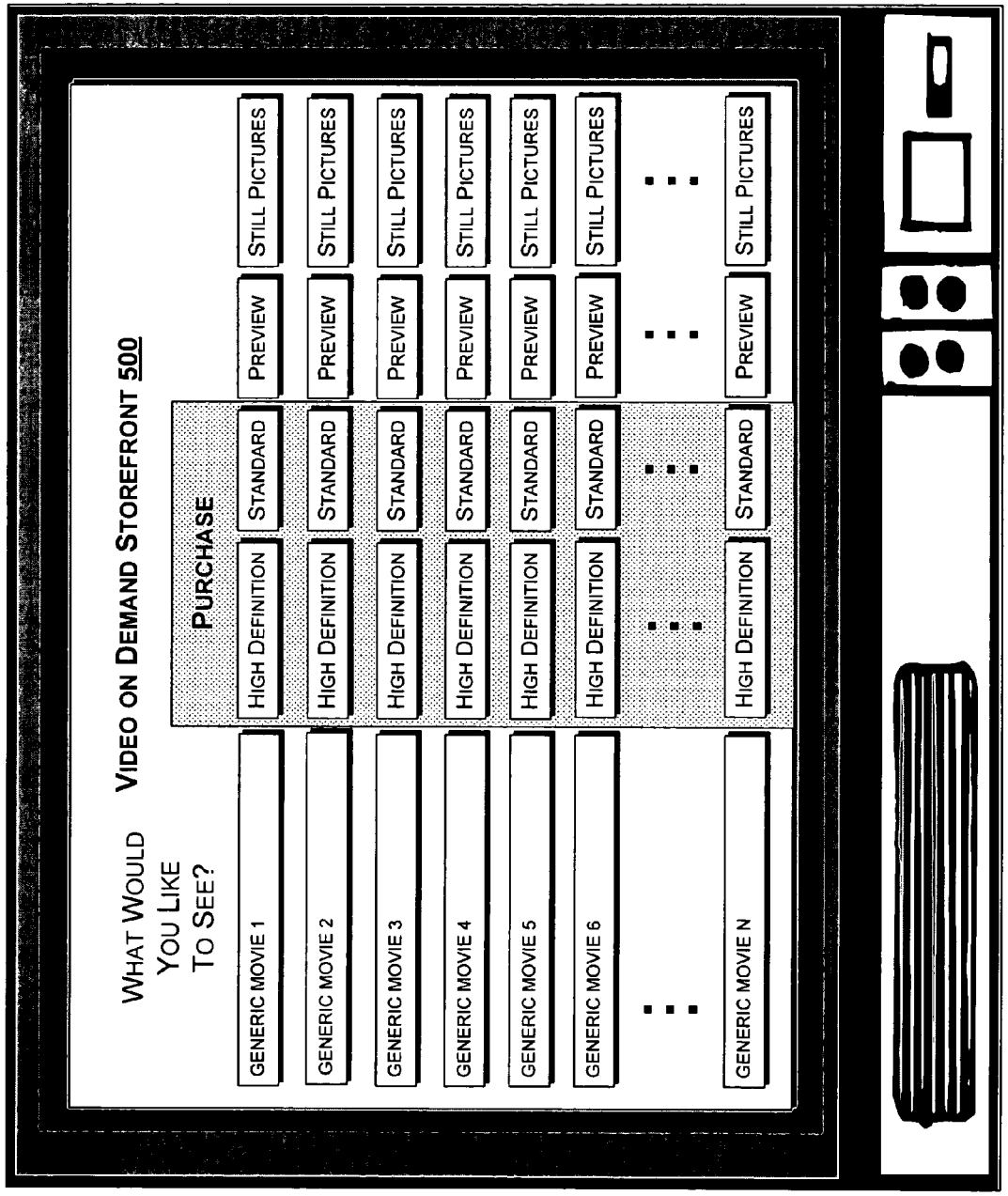
FIG. 11 is a diagrammatic representation of an exemplary video on demand storefront user interface.

FIG. 11 shows an exemplary video on demand (VOD) storefront user interface (UI) 500 for selecting services 206 that are linked to VOD subsystems (e.g., such as VOD subsystems in FIG. 9). A multimedia system 300 using a VOD storefront UI 500 uses the exemplary SI map structure 400 to allow a customer to select which multimedia content is to be viewed at any given time. Thus, services 206 associated with VOD subsystems can initiate multimedia content from the temporal beginning of a program, rather than receiving spooled streams that are in progress.

In the VOD storefront UI 500, a user has more direct control over the intents 210 and display contexts 214 for presenting the multimedia content. In one implementation, there is no need for a service collection to be associated with a channel. For example, a button in the UI may refer directly to a service collection and specific intent without going through a conventional channel. So VODs may be accessible in this manner as well as via channels in a channel lineup. Thus, a user may be able to directly select which content to receive, including a video preview or a still picture preview of the content. Likewise, the user may be able to more directly modify an authentication level 212, because the user is presented, for example, with options for purchasing a higher authorization level 212 to receive standard or high-definition proprietary content, e.g., pay-per-view. A SI navigator 312 powering the VOD storefront UI 500 works in substantially the same manner as with a traditional program guide grid, with only a few differences. The VOD storefront UI 500 typically requires fewer or simpler rules 538 for automatically determining intents 210 and authorizations 212, as the user can sometimes input these directly.

Figure 12:
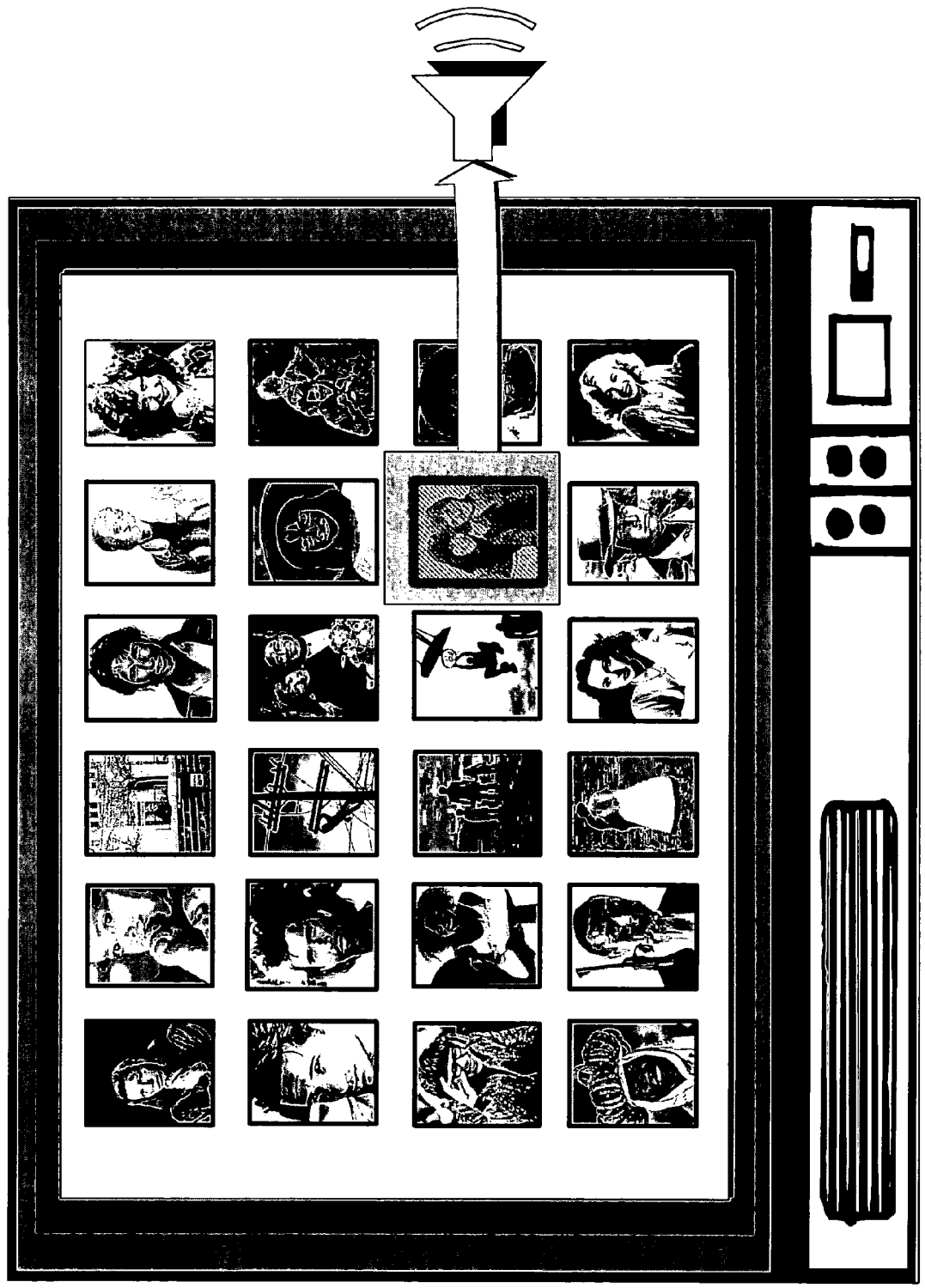
FIG. 12 is a diagrammatic representation of an exemplary mosaic guide user interface.

FIG. 12 shows an exemplary mosaic program guide UI 500, in which video streams for every channel to be offered are shown simultaneously in PIP windows or thumbnail windows, via service collections. Service collections allow unprecedented flexibility and can provide users with a host of conventional functionalities together with new functionalities, all within the exemplary SI schema described herein—i.e., all in one package, without a need to switch back and forth between exemplary SI and conventional modalities. For example, as the navigation controls of a TV remote controller select one of the thumbnail windows (or in a personal computing environment, as a mouse or other keyboard device selects one of the thumbnail windows), a SI navigator 312 may actuate an audio service from the service collection 200 corresponding to the current thumbnail's channel. In this manner, as the user moves the mouse over successive thumbnails, the audio stream of only the currently selected thumbnail becomes audible. A user may select one of the thumbnails for fullscreen primary video and audio services by double clicking a thumbnail or pressing the "enter" key on the TV remote controller, etc. In one implementation, selecting or moving the mouse over one of the thumbnail windows actuates a service 206 from the respective service collection 200 that displays a quarter-screen or eighth-screen intent in a part of the display monitor that does not obstruct the selected thumbnail (not shown).

Figure 13:
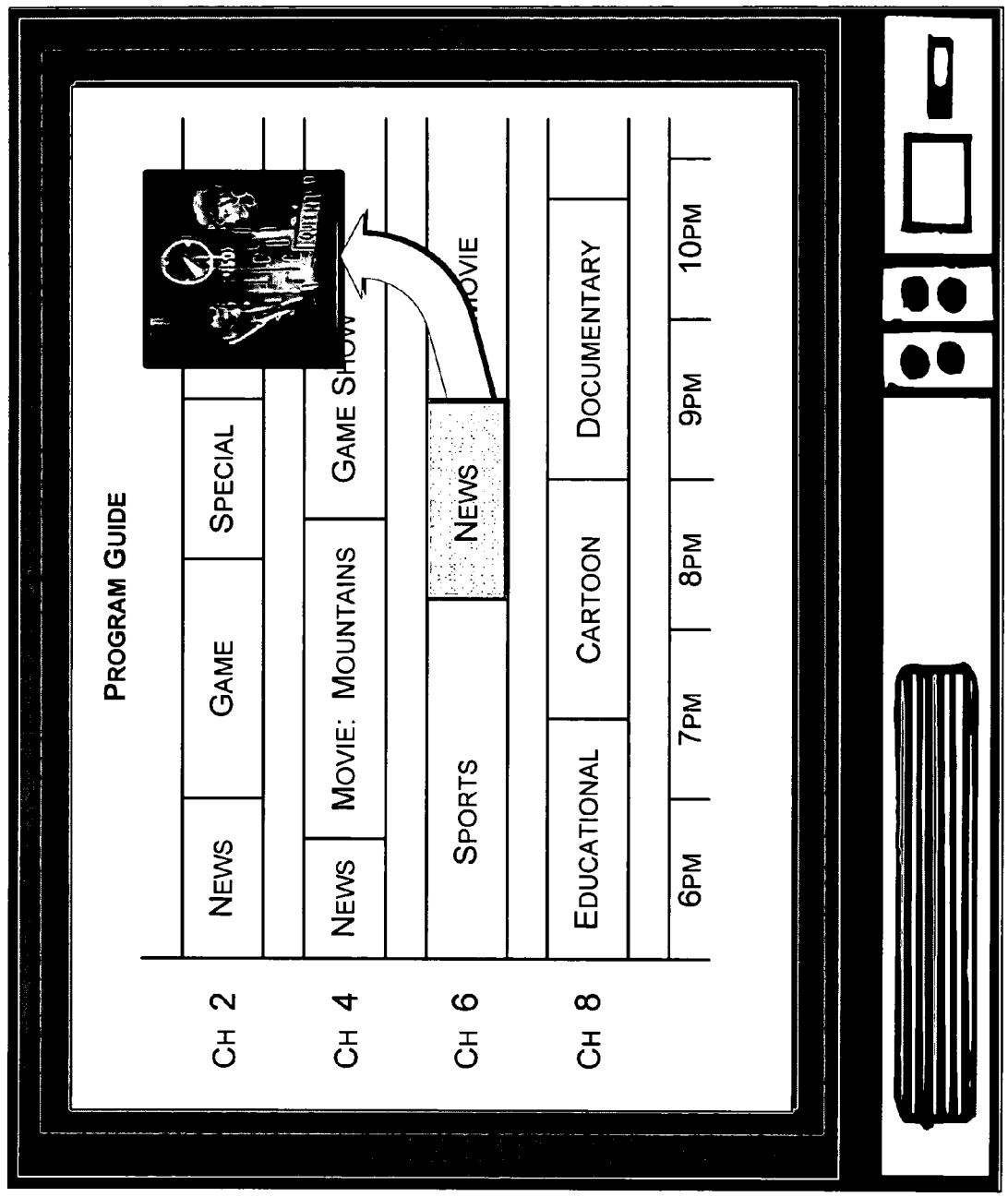
FIG. 13 is a diagrammatic representation of an exemplary electronic program guide user interface.

FIG. 13 shows an exemplary EPG program guide UI 500 that exploits the flexibility and power of service collections 200. As a user selects a text entry in the EPG program guide, a service 206 for a PIP intent is actuated from the service collection 200 for that channel. As the user moves among successive text entries in the EPG program guide, successive PIP windows play a video stream corresponding to each text entry, in turn.

Exemplary Methods

FIG. 14 shows an exemplary method 1400 of creating an exemplary service collection. In the flow diagram, the operations are summarized in individual blocks. The exemplary method 1400 may be performed by hardware, software, or combinations of both, for example, by an exemplary service information creation engine 306.

At block 1402, multiple display contexts are created for presenting a channel's multimedia content to a user. Each display context is selected to respond to a client condition. Exemplary client conditions are the availability of subsystems to display the content, and authorizations to receive the content. The screen size of a video presentation and the resolution (or level of definition) of a video presentation are particularly dependent on hardware and/or software subsystems in a client device. For example, a fullscreen high-definition display context intended for a large television may be unnecessary for a UI display of a cellphone. Thus, in one implementation, a display context is the product of the intended screen size, or "intent," and an authorization level for receiving content in a resolution suitable for the screen size.

At block 1404, one or more services are tagged to be actuated for each display context. That is, one or more services are linked to each display context. When an exemplary service information navigator 312 determines a display context for a given client circumstance, e.g., according to rules, then the tagged services are actuated.

At block 1406, the services tagged at block 1404 are bundled into a service collection for a channel. The display contexts and services to be actuated depend on client conditions when the service collection is tuned.

FIG. 15 shows an exemplary method of using a service collection. In the flow diagram, the operations are summarized in individual blocks. The exemplary method 1500 may be performed by hardware, software, or combinations of both, for example, by an exemplary service information navigator 312.

At block 1502, a display context is selected based on client conditions. That is, a service collection typically has multiple display contexts available for use on a channel. Each display context is implemented by services assigned to the display context according to rules. Two client conditions that are especially relevant to which display context is selected for current use are the current availability of subsystems to actuate the services of an intended display context (i.e., the "intent") and current authorizations to access multimedia content from the services associated with the display context. An exemplary SI navigator 312 can determine current client conditions for selecting a display context.

At block 1504, services associated with the selected display context are actuated. That is, identifiers for the services to be actuated are included in a service collection for the current channel and once the identifiers for the services to be actuated are found, then an exemplary SI navigator 312 can use exemplary SI maps 400 to find subsystems for actuating the services, and can also find any settings and information the subsystems use in order to operate.

Conclusion

The foregoing discussion describes exemplary mixed-media service collections for multimedia platforms. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented in multimedia network for multimedia content delivery, comprising:
   selecting multiple services for rendering multimedia content;
   combining the multiple services into a service collection, wherein the service collection is associated with a channel capable of being accessed by a client,
   selecting multiple display contexts;
   associating one or more of the services, which may be of different types, in the service collection with each display context; and
   associating each display context with one or more client conditions, wherein if the one or more client conditions occur then the display context associated with the one or more client conditions is selected and the services associated with the display context are actuated,
   wherein multiple services can be actuated to display multiple forms of content simultaneously, and
   wherein services in the service collection are actuated in response to at least one client condition.

2. The method as recited in claim 1, wherein the service collection includes services for rendering different media types, wherein the different media types include two diverse media types from a group of media types consisting of a video media type, an audio media type, a still images media type, a hypertext markup language (HTML) media type, and a slideshow media type.

3. The method as recited in claim 1, further comprising:
   determining an availability of subsystems on the client for implementing the services;
   determining authorizations of the client to receive the services; and
   basing the at least one client condition on the determined availability of subsystems and the determined authorizations.

4. The method as recited in claim 1, wherein the one or more client conditions include one of an availability of a subsystem on the client or an authorization possessed by the client.

5. The method as recited in claim 1, wherein the one or more client conditions include both an availability of a subsystem on the client and an authorization possessed by the client.

6. The method as recited in claim 1, wherein if the client does not possess an authorization for a primary display context, then a secondary display context includes a service for one of an upsell presentation, a preview, a cinematic trailer, a poster, or a looping ad.

7. The method as recited in claim 1, wherein one of the display contexts includes a video service and a simultaneous audio service, wherein one of the streams is received from a headend and the other stream is received from the Internet.

8. The method as recited in claim 1, further comprising prioritizing the display contexts according to a level of authorization used to receive the services associated with each display context.

9. The method as recited in claim 1, wherein associating a display context with a client condition is based on rules relating an available subsystem to a display context and relating an authorization to a display context.

10. The method as recited in claim 1, wherein a display context includes an upsell service, wherein the upsell service comprises a different service type from other services associated with a display context.

11. The method as recited in claim 1, wherein the service collection includes services for providing video-on-demand choices comprising multimedia content of different media types.

12. The method as recited in claim 1, wherein the service collection includes services for rendering a partial-screen video of multimedia content in response to a user selecting an electronic program guide entry corresponding to the multimedia content.

13. A multimedia system, comprising:
   a first processing unit for switching a multimedia client between multiple intents, wherein the intents direct the multimedia client to one of a high bit rate, a medium bit rate, or a low bit rate multimedia stream based on one of multiple display contexts selectable by the multimedia client; and
   a second processing unit for resolving multiple prioritized services associated with one of the multiple display contexts into a presentation, wherein the resolving is based on a level of authorization of the multimedia client, the multimedia system operable to:
   select multiple display contexts;
   associate one or more of the services, which may be of different types, in a service collection with each display context; and
   associate each display context with one or more client conditions, wherein if the one or more client conditions occur then the display context associated with the one or more client conditions is selected and the services associated with the display context are actuated, and
   wherein multiple prioritized services can be actuated to display multiple forms of content simultaneously.

14. The multimedia system as recited in claim 13, further comprising:
   a collection assembler for associating multiple mixed-media services with a the service collection addressable by the display contexts; and
   a context assembler for associating one or more of the mixed-media services to the display contexts.

15. The multimedia system as recited in claim 14, further comprising an authorization level assembler for establishing which of the display contexts are to be used in response to a current level of permission to use a multimedia content.

16. The multimedia system as recited in claim 13, further comprising an intent assembler for establishing which of the display contexts are to be used in response to a current availability of a subsystem.

17. The multimedia system as recited in claim 13, further comprising one or more map engines to create maps relating identifiers for each of the multiple prioritized services with identifiers for: channel numbers, electronic program guide data, subsystems for implementing the services, and information for implementing the subsystems.

18. The multimedia system as recited in claim 13, further comprising:
   a service collection tuner, comprising:
       an authorizer for determining levels of permission for using each of the multiple prioritized services in a service collection;
       an intent engine for determining an availability of each of multiple subsystems for implementing the multiple prioritized services;

a context tuner for determining which of the multiple prioritized services to actuate based on the determined levels of permission and the determined availability of each of multiple subsystems; and a services tuner to actuate the prioritized services determined by the context tuner.

19. A computer readable storage medium, including instructions executable on a computing device for performing actions, including:

associating multiple mixed-media services with a service collection, the service collection is associated with a channel;

selecting multiple display contexts;

associating one or more of the services, which may be of different types, in the service collection with each display context; and associating each display context with one or more client conditions, wherein if the one or more client conditions occur then the display context associated with the one or more client conditions is selected and the services associated with the display context are actuated;

deciding which subsystems for actuating the multiple mixed-media services are currently available on a client device that uses the service collection;

deciding which permissions for using the multiple mixed-media services are currently available on the client; and simultaneously tuning some of the mixed-media services depending on which of the subsystems are currently available and which of the permissions are currently available, wherein multiple forms of content can be displayed.

* * * * *